United States Patent [19]

Jones, Jr.

[11] 4,003,001
[45] Jan. 11, 1977

[54] MULTI-LINE, MULTI-MODE MODULATOR USING BANDWIDTH REDUCTION FOR DIGITAL FSK AND DPSK MODULATION

[75] Inventor: Gardner D. Jones, Jr., Raleigh, N.C.

[73] Assignee: International Business Machines Corporation, Armonk, N.Y.

[22] Filed: Nov. 10, 1975

[21] Appl. No.: 630,246

Related U.S. Application Data

[62] Division of Ser. No. 525,699, Nov. 21, 1974, Pat. No. 3,958,191.

[52] U.S. Cl. .................................. 332/1; 178/66 A; 325/163; 332/9 R; 332/11 R; 332/16 R; 332/21; 332/22
[51] Int. Cl.² ................... H03C 3/02; H04L 27/20
[58] Field of Search ........... 332/1, 9 R, 11 R, 16 R, 332/21, 22; 325/30, 161, 163, 164; 178/66 A

[56] References Cited

UNITED STATES PATENTS

| 3,773,975 | 11/1973 | Koziol | 332/9 R X |
| 3,787,785 | 1/1974 | Bass | 332/9 R |

*Primary Examiner*—Siegfried H. Grimm
*Attorney, Agent, or Firm*—John B. Frisone

[57] ABSTRACT

A frequency shift keyed (FSK) modulator capable of substantially simultaneously modulating a plurality of binary encoded data signals at different baud rates and modulation frequencies for substantially simultaneous transmission over a plurality of communication lines and in which the modulated signals are of narrow bandwidth thus requiring the same simple RC filter for all lines regardless of the baud rates or signalling frequencies used.

9 Claims, 7 Drawing Figures

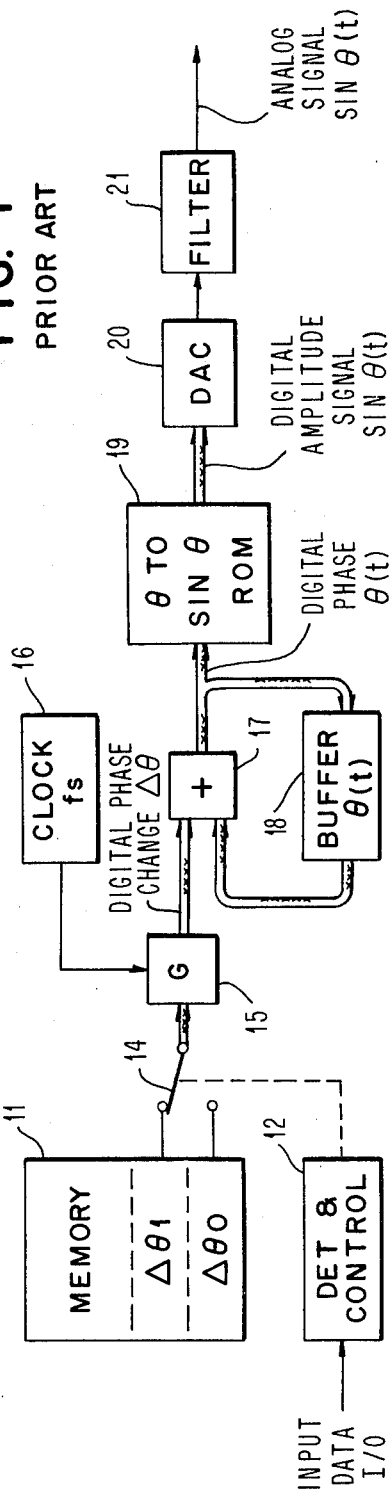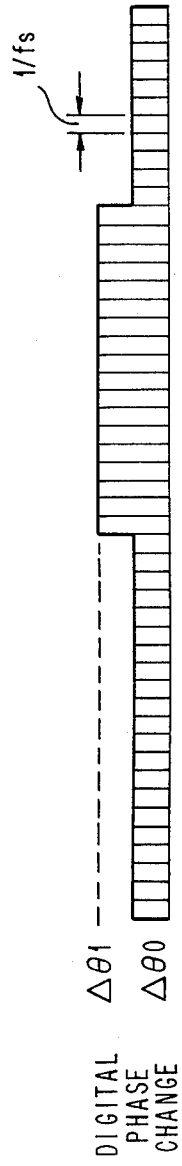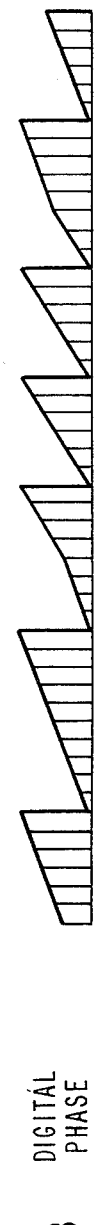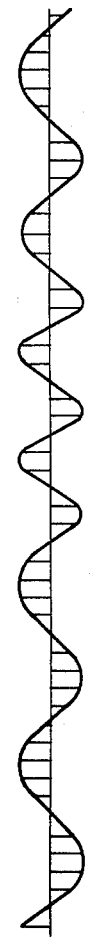

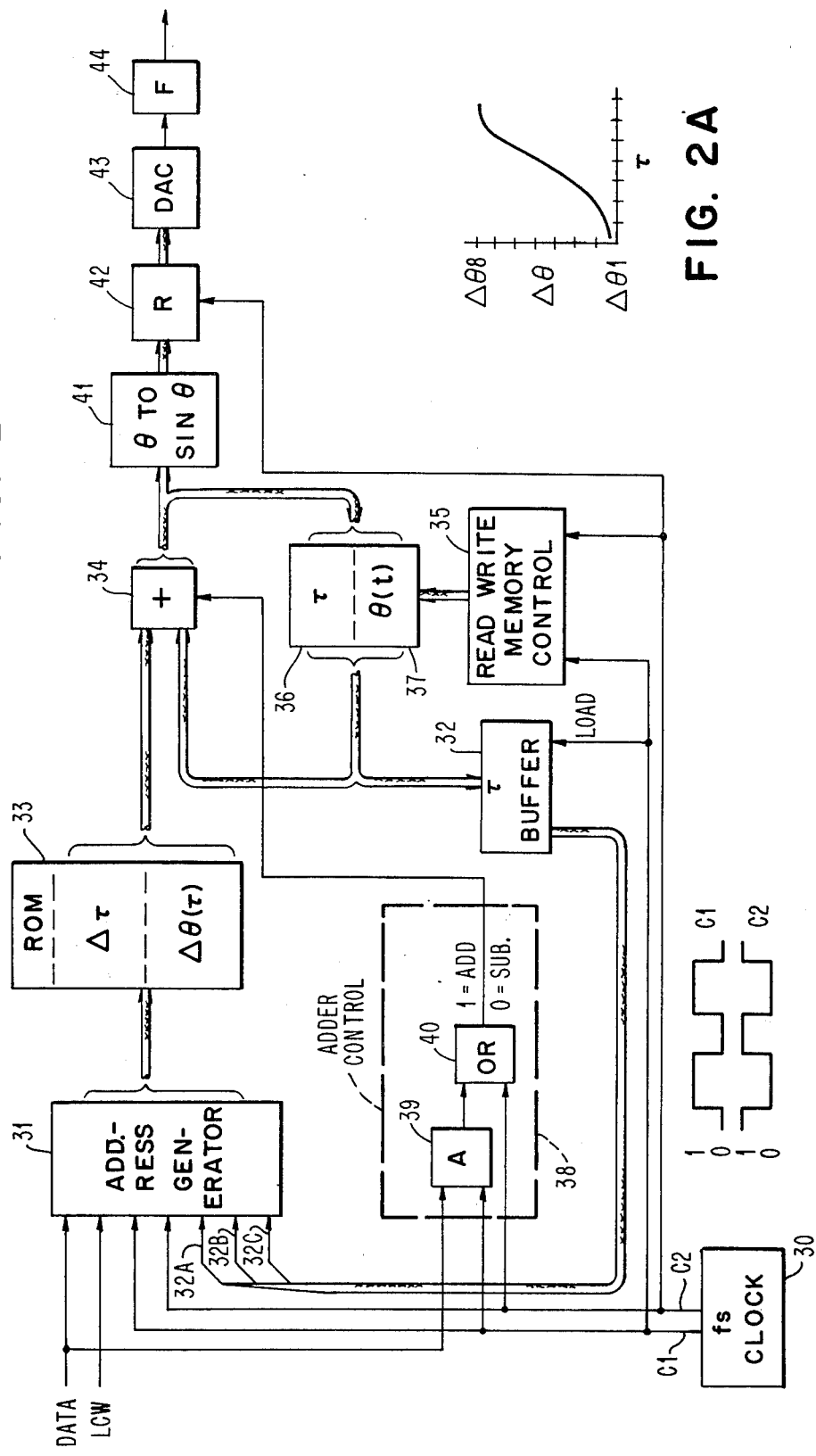

FIG. 3

| MEMORY ADDRESS | MEMORY CONTENTS | LCW | DATA | $\tau$ A B C | | | C1 | C2 |
|---|---|---|---|---|---|---|---|---|
| i | T/8 FOR LINE TYPE 1 | 0 | X | $[A+B+C] \cdot \overline{A \cdot B \cdot C}$ | | | 1 | 0 |
| i + 1 | 000········00 | 0 | 0<br>1 | 0<br>1 | 0<br>1 | 0<br>1 | 1 | 0 |
| i + 2 | Δθ1 FOR TYPE 1 | 0 | X | 0 | 0 | 0 | 0 | 1 |
| i + 3 | Δθ2 " " " | 0 | X | 0 | 0 | 1 | 0 | 1 |
| i + 4 | Δθ3 " " " | 0 | X | 0 | 1 | 0 | 0 | 1 |
| i + 5 | Δθ4 " " " | 0 | X | 0 | 1 | 1 | 0 | 1 |
| i + 6 | Δθ5 " " " | 0 | X | 1 | 0 | 0 | 0 | 1 |
| i + 7 | Δθ6 " " " | 0 | X | 1 | 0 | 1 | 0 | 1 |
| i + 8 | Δθ7 " " " | 0 | X | 1 | 1 | 0 | 0 | 1 |
| i + 9 | Δθ8 " " " | 0 | X | 1 | 1 | 1 | 0 | 1 |
| MEMORY ADDRESS | MEMORY CONTENTS | LCW | DATA | $\tau$ A B C | | | C1 | C2 |
| j | T/8 FOR LINE TYPE 2 | 1 | X | $[A+B+C] \cdot \overline{A \cdot B \cdot C}$ | | | 1 | 0 |
| j + 1 | 000········00 | 1 | 0<br>1 | 0<br>1 | 0<br>1 | 0<br>1 | 1 | 0 |
| j + 2 | Δθ1 FOR TYPE 2 | 1 | X | 0 | 0 | 0 | 0 | 1 |
| j + 3 | Δθ2 " " " | 1 | X | 0 | 0 | 1 | 0 | 1 |
| j + 4 | Δθ3 " " " | 1 | X | 0 | 1 | 0 | 0 | 1 |
| j + 5 | Δθ4 " " " | 1 | X | 0 | 1 | 1 | 0 | 1 |
| j + 6 | Δθ5 " " " | 1 | X | 1 | 0 | 0 | 0 | 1 |
| j + 7 | Δθ6 " " " | 1 | X | 1 | 0 | 1 | 0 | 1 |
| j + 8 | Δθ7 " " " | 1 | X | 1 | 1 | 0 | 0 | 1 |
| j + 9 | Δθ8 " " " | 1 | X | 1 | 1 | 1 | 0 | 1 |

MULTI-LINE, MULTI-MODE MODULATOR USING BANDWIDTH REDUCTION FOR DIGITAL FSK AND DPSK MODULATION

This is a division, of application Ser. No. 525,699 filed Nov. 21, 1974 and now Pat. No. 3,958,191.

FIELD OF THE INVENTION

The invention relates to modulators in general and more particularly to novel frequency shift Keyed (FSK) modulators which directly provide a reduced bandwidth modulated signal and to a multi-line modulator capable of simultaneously, on a time shared basis, modulating, frequency shift keyed signals from a plurality of sources for transmission over a plurality of lines.

DESCRIPTION OF THE PRIOR ART

A technique in current use permits the digital synthesis of a sinusoidal wave by directly computing phase angle and performing a phase to amplitude translation by means of a table look-up of previously computed digital values. The digital values may then be converted to analog form by conventional digital to analog conversion techniques. This general digital technique of tone synthesis has been specifically applied to digitally implemented frequency and phase shift keyed modulators. Such a prior art frequency shift keyed modulator is illustrated in FIG. 1. In FIG. 1, a memory 11 contains two values $\Delta\theta 0$ and $\Delta\theta 1$. These digital values represent increments of phase of two waves $\sin\theta 0$ and $\sin\theta 1$ used to represent in analog form the binary 0 and 1 data. The input data is applied to a controller 12 which selects, via a switch 14, $\Delta\theta 0$ or $\Delta\theta 1$ depending on the input data applied. This is shown in FIG. 1A for a serial input data pattern of (010).

The selected value of $\Delta\theta$ is applied via a gate 15, under control of a clock 16 at a frequency fs, to one input of an adder 17 which adds this value to the contents of a buffer 18 which is connected to the output of adder 17. The output of adder 17 is illustrated in FIG. 1B. The output of adder 17 is applied to a read only memory 19 which accepts the digital phase of $\theta(t)$ and by table lock up provides a digital amplitude signal $\sin\theta(t)$. This signal is applied to a digital to analog converter 20 which supplies a signal to a filter 21 (FIG. 1C).

The filter 21 is, of necessity, a complex filter since the signal from the modulator includes significant out of band energy introduced by the step-like frequency shifts. In addition, the characteristics of filter 21 must be modified to take into account the specific frequencies used to transmit the binary 1 and 0 values and the rate of transmission. Thus, a different filter must be provided for each type or modulator implemented. Similar digital techniques may be used for both multi-frequency (MF) and differential phase shift keyed (DPSK) modulation.

A modulation technique similar to that illustrated in FIG. 1 is utilized in the time shared multiline FSK modulator disclosed in U.S. Pat. No. 3,697,892 to Lawrence et al which provides a specific type of FSK modulation for a set of lines. The multiline time-shared modulator, however, requires separate digital to analog converters for each line and a band pass filter for each line capable of eliminating undesired out of band frequency components generated in the modulation process. Because of these requirements, the multiline modulator is incapable of handling a wide variety of modulation techniques which may be used for any of the output lines. This is so because of the specific requirements for the individual output line band pass filters. In the patented device, each output line must, of necessity, be limited to one type of modulation. If it is desired to change the modulation characteristics for a given line, it becomes necessary to alter the characteristics of the connected band pass filter. This requirement severely limits the usefulness of the multiline modulator since the lines cannot be dynamically allocated to different modulation techniques.

SUMMARY OF THE INVENTION

The invention is directed to novel digital FSK and DPSK modulators which produce at their output modulated signals in which out of band energy is reduced thus eliminating the need of any filtering except for simple RC filters for removing quantizing noise introduced by the digital modulation used. These modulators are combined in a novel multi-line modulator which is capable of dynamically providing a wide variety of signal modulations on a large number of lines with a substantial reduction of equipment and cost.

BRIEF DESCRIPTION OF THE DRAWINGS

FIG. 1 is a schematic diagram of a prior art digital FSK modulator;

FIGS. 1A, 1B and 1C are graphs illustrating the signals present at several points in the circuit of FIG. 1;

FIG. 2 is a schematic diagram of a novel FSK modulator according to the invention;

FIG. 2A is a graph for illustrating the operation of the modulator illustrated in FIG. 2; and FIG. 3 is a table showing the relationship between the selection signals applied to the address generator of FIG. 2 and the read only memory contents.

DESCRIPTION OF THE PREFERRED EMBODIMENT

FIG. 1 described in detail above illustrates the application of digital tone synthesis techniques in an FSK modulator. A digital value of phase $\theta(t)$ is accumulated and updated each processing cycle determined by fs where fs is the sampling rate of the resulting modulated digital line signal. The amount by which the phase is incremented each sample time, $\Delta\theta$, determines the slope of $\theta(t)$ and hence the instantaneous frequency of the sine wave generated. For binary FSK, one of two values of phase increment $\Delta\theta 0$ and $\Delta\theta 1$ are selected depending on the data which is to be transmitted. The frequency of the sine wave being generated is directly proportional to the value of $\Delta\theta$. $\Delta\theta$ and $\theta(t)$ are both digital signals and the accumulation is performed with conventional arithmetic components. The digital phase signal is scaled such that arithmetic overflow of the accumulator or buffer 18 corresponds to the normal modulo 360° property of the trignometric sine function.

The digital representation of phase $\theta t$ is translated to a digital representation of $\sin\theta(t)$ by means of the read only memory 19. The resulting digital amplitude signal is converted to analog by conventional digital to analog conversion techniques and subsequent analog filtering. The quantizing noise resulting from the conversion from digital to analog is removed by the analog filtering along with other unwanted frequency components introduced by the modulating technique.

In the FSK modulator illustrated in FIG. 1, as well as in other conventional FSK modulators implemented with either analog or digital circuits, the instantaneous frequency of the transmitted signal is abruptly switched between two values in the course of being modulated by the input data signal. The abrupt transition in frequency causes an increase in the bandwidth of the transmitted signal over that actually required to communicate the data by the FM modulation process. When FSK data transmission over telephone channels is required, it is necessary to reduce the excessive bandwidth generated in two significant application areas. One in high speed FSK, 1200 to 1800 bits per second transmission, bandwidth reduction is necessary to comply with out of band signal regulations imposed by various regulatory agencies and two in full duplex transmission using a single physical channel, the received signal can, in many instances, be significantly smaller in amplitude than the local transmitted signal and the two frequency bands occupied by the two signals may be relatively close. This requires that the bandwidth of the transmitted signal be sharply reduced in order to prevent interference with the received signal.

Classically, FSK bandwidth reduction has been attained through band pass filtering of the transmitted signal. Some modulators have used premodulation filtering of the data signal; however, this approach has had limited application since it requires a linear FM modulator. Either of the above approaches for reducing unwanted signals introduced in the modulation process has a drawback in a digital implementation of the modulator since the arithmetic requirements of a digital filter greatly increase the functional complexity of the unit. For this reason, some digital modulators have used rather complex analog filters in their implementation.

A significant reduction in bandwidth can be achieved by eliminating the abrupt frequency transitions normally present in FSK modulation of binary data. This can be done by having the instantaneous frequency make a smooth or continuous transition in changing from one value to another. This is pointed out by Bettinger in "Digital Transmission for Mobile Radio," Electrical Communications, Vol. 47, No. 4, 1972 at page 225. Such an approach has been implemented by the use of a premodulation filter, as noted earlier, or by the application of a control signal or voltage to a linear modulator. This approach while producing a desirable result is not flexible in many uses and limits the utility of the modulator to a single baud rate and set of frequencies.

In a digital FSK modulator constructed according to the invention, a smooth transition in frequency is accomplished by storing in memory digital values which represent a predetermined trajectory for the instantaneous frequency to follow and selecting these values based on the interbaud time or time since the last data transition. Such an approach is viable only in a digital FSK modulator where the phase and rate of phase change can be accurately specified. The trajectory followed as the frequency is slewed from one value to another is selected to minimize the bandwidth of the modulated signal. Both the shape and the number of intermediate points in the trajectory, per bit time, are important parameters in this regard. Analysis and experiment has shown that a sinusoidal trajectory with eight points specified in time over the data bit give the best performance in terms of minimum transmit signal bandwidth and minimum loss in receiver detectability. This does not, however, imply that an eight point sine wave trajectory is optimum in general. When this technique is implemented as shown in the modulator illustrated in FIG. 2, out of band signaling is reduced to the point where output filtering is no longer required and the sole filtering requirement is that necessitated by the digital modulation technique employed, that is, the removal of the quantizing noise. This may be accomplished by a simple RC filter.

The modulator illustrated in FIG. 2 is capable of providing the FSK modulation for a single line of a number of different types or frequencies of FSK modulation. It requires binary input data and a line control word signal which in the illustrated embodiment is a single line designating either one type of FSK modulator or another. If the one type is designated, the line will be at a voltage level indicating the binary 0 and if the other type is indicated, the line voltage will be at a voltage indicating a binary 1. This, of course, could be expanded by providing additional lines for designating the line control word. In addition, the clock generator 30 operating at a frequency fs provides two clock phase signals C1 and C2. These are illustrated graphically in the figure and are 180° out of phase with each other. The data signals, the line control word and the two clock signals are applied to an address generator 31. The address generator 31 also receives signals from three conductors 32A, 32B and 32C. These 3 conductors represent the three high order bits from a buffer register 32, the function of which will be described later on. Based on the inputs described above, address generator 31 logically derives an address which is applied to a read only memory 33 to access during one-half of the clock cycle fs, a value $\Delta$ and during the other half of the clock period fs, the value $\Delta\theta\tau$.

The contents of memory 33 are set out in the table of FIG. 3. This table is divided into two sections. It shows memory addresses is $i - i+9$ which are associated with line control word O for one type of FSK modulator and memory addresses $j - j+9$ which are associated with line control word 1, another type of FSK modulator. Obviously, if additional types of FSK modulators are to be implemented, additional sections of memory would be necessary as well as additional lines for the line control word to distinguish the various FSK modulators being implemented. The conditions of the selection signals are indicated in the righthand columns of the table underneath the headings "LCW" (Line Control Word), Data, $\tau$, c1 and c2. During the first half of the clock cycle fs, that is, when c1 and c2 are 1, 0 respectively, the contents of addresses $i$ and $i+1$ or $j$ and $j+1$ depending on the line control word, will be selected if the three high order bits from buffer 32 are all zeroes or all ones and the data bit is 0 or 1, respectively, the contents from address $i+1$ or $j+1$, namely, all zeroes will be provided at the output of the read only memory during that particular fs clock cycle. If the contents of the three high order bits and the data bits are any other value, the contents of address $i$ or $j$ depending on the line control word will be selected. In this case, this value is an increment dividing the bit period $\tau$ into eight different values to provide as shown in FIG. 2A, eight different values of $\Delta\theta$ over a single bit period for causing the frequency of the output of the modulator to change values smoothly or sinusoidally as discussed above. For example, if the sampling frequency fs of 18,000 cycles per second is selected, this would yield 30 samples per bit for a 600 bit per second line. Thus, a value of 120 for $t/8$ will provide eight substantially equal steps if the three high order bits of a 12 bit position register are examined. Therefore, the numerical value 120 will be stored in binary form in memory address $i$ to implement a FSK modulation for a 600 bit per second data rate. During the fist half of each cycle fs, this value under the conditions described above, that is, data not zero and the three high order bits from buffer 32 not all zero or data not one and the three high order bits from buffer 32 not all ones, will be added or subtracted to modify the contents of register 36. How this is accomplished will become apparent as the description of the circuit shown in FIG. 2 continues.

During the second half cycle of clock fs, that is, Cl(0) and C2(1), the values $\Delta\theta 1$ through $\Delta\theta 8$ residing in address locations $i+2$ through $i+9$ will be added in a manner similar to that illustrated in FIG. 1 and described below to thus generate the actual output frequencies from the modulator. The form of the values $\Delta\theta 1$ through $\Delta\theta 8$ is illustrated in the graph shown in FIG. 2A. These values are selected to provide a smooth transition from the one frequency to the other.

The contents, under the conditions described above, from read only memory 33 are applied to one input of an adder circuit 34. The output of the adder circuit is selectively applied under control of clock 30 and a read write memory control circuit 35 to one of two registers 36 and 37. During the first half of the clock period fs, the output of adder circuit 34 is inserted in register 36 under control of read write memory control circuit 35 and during the second half of the clock fs, the output of adder circuit 34 is inserted in register 37. Likewise, the contents of register 36 are added in adder 34 during the first half of the clock cycle from clock 30 with the output of read only memory 33 and during the second half cycle of clock 30, the contents of register 37 are added in adder 34 with the output from read only memory 33. The addition and readback occur under control of read write memory control circuit 35 are different portions of the output from clock circuit 30. Thus, during the first portion of each of the clock cycles, the contents of the registers 36 and 37 are added to the output of memory 33 by adder 34. After the addition takes place the sum of this addition is inserted into the registers 36 and 37. Read write memory control circuit 35 may take many forms as is well known in the prior art for controlling reading into and out of memory devices and is not shown in greater detail here since it is well known in the prior art. The contents of register 36 under control of the clock 30 Cl output are transferred to buffer 32 and the three high order bits of this register which may, for example, contain 12 bit positions are applied via conductors 32A, 32B and 32C to the address generator 31 and are used as described above for generating the address within read only memory 33 of the data which must be applied during each clock cycle to adder 34.

An adder control circuit 38 responds to the output of clock 30 and the data input to control the function of adder 34; that is, whether an addition or subtraction takes place. During the first half of the clock period of clock 30, an addition or subtraction will take place depending upon the direction of change of the data. If the data changes from a 1 value to a 0 value, the contents of register 36 must be decremented and if the data changes from a 0 to a 1, the contents of register 36 must be incremented. Adder control 38 includes an AND circuit 39 having one input connected to the data line and another input connected to the C1 output of the clock 30. The output of AND circuit 39 is connected via an OR circuit 40 to a control input of adder 34. When the data is 1 and during the first half of the clock period of clock 30, AND circuit 39 provides an output via OR circuit 40 which causes the adder to increment or add. When the data is zero, the output of AND gate 39 is down and this signal level causes adder circuit 34 to decrement. The specific implementation of this control is well known in the art and is not further described here. During the second half of clock 30, the C2 output is connected via OR circuit 40 to the control input of adder 34 and causes the adder to increment during this second half of the clock period. Buffer 32 is loaded under control of the C1 output of clock 30, thus, after the contents of register 36 have been modified as described above, the new value calculated is loaded into buffer 32 where it will be available for the next cycle of clock 30 during the next sampling period.

The output of adder 34 is applied to a $\theta$ to sine $\theta$ conversion circuit 41 which may be a read only memory loaded with precomputed values of sine $\theta$ to perform the conversion. Such devices are well known in the prior art and readily available and are illustrated throughout this specification in block form only. The output of $\theta$ to sine $\theta$ converter 41 is applied to a register 42. Register 42 is strobed under control of the C2 clock from clock generator circuit 30 and the contents applied at that time to a conventional digital to analog converter 43. The output of digital to analog converter 43 pulses a simple RC filter 44 which is designed solely to remove the quantizing noise introduced by modulation process. It is obvious from the above description that the modulator may be changed from any group of frequencies to some other group of frequencies simply by changing the line control word and storing the appropriate values for that group in the read only memory 33 since the filter 44 is the same for all values, it need not be changed or switchable.

The basic processing time in FIG. 2 is divided into two parts, C1 and C2. During C1 time, a running accumulation of bit time is calculated. During C2 time, a phase accumulation is calculated as is done in the conventional digital modulator illustrated in FIG. 1, with the exception that the values of $\Delta\theta$ are selected from memory on the basis of the bit time $\tau$ from register 32. If a data transition occurs, during C1 time, numerical value which at the sampling rate will provide eight substantially equal detectably different outputs from register 32 is selected from the $\Delta\tau$ memory and added or subtracted depending on the data input. The baud time accumulation is made sharing the same adder 34 as is used for the phase accumulation. The digital value of baud time is prevented from underrunning, that is, going below the all zero state when $\Delta\tau$ is subtracted or overrunning, that is, going above the all one state when $\Delta\tau$ is added. This is accomplished by the all zero condition stored in memory location $i+1$ or $j+1$ since adding or subtracting all zeroes to any number does not change it. This memory address is selected on the basis of the conditions shown in the table of FIG. 3, namely, data 1 and $\tau$ all one or data 0 and $\tau$ all zero. In both of these conditions, an under or over run could occur. Therefore, the zero value is added to the value of $\tau$ contained in register 36 during each processing cycle. With this control, the baud time value changes from an all zero state to an all one state in eight equal steps spanning the complete bit time when the data changes from a 0 to a 1. Thereafter, the baud time remains at the all one state until the data changes back to zero. At which time, $\Delta\tau$ is subtracted and $\tau$ is permitted to increment to the all zero state.

At the end of C1 time, the highest three bits of $\tau$ are transferred to register 32 and used to address the $\Delta\tau$ memory during C2 time. The three highest bits of $\tau$ select one of the 8 values of $\Delta\theta$ to be accumulated as $\tau$ traverses from one data state to the other. As indicated in FIG. 2A, the values of $\Delta\theta$ addressed by $\tau$ produce a smooth or sinusoidal trajectory in the instantaneous frequency of the transmitted signal. The phase accumulation, phase to sine conversion, and digital to analog conversion are performed in the same manner as for the conventional modulator illustrated in FIG. 1.

While the invention has been particularly shown and described with reference to a preferred embodiment thereof, it will be understood by those skilled in the art that various changes in form and details may be made therein without departing from the spirit and scope of the invention.

What is claimed is:

1. An FSK modulator for modulating serial binary encoded data by generating an analog signal of a first frequency for representing binary data of one value and an analog signal of a second frequency for representing binary data of said other value comprising:
    first memory means storing a first numerical value representing a fraction of the baud time of the serial binary encoded data and a plurality of second numerical values each representing different frequency increments;
    an adder having two inputs, one of which is connected to the output of said first memory means;
    first and second registers, each having an input connected to the output of said adder and an output connected to the said other input of said adder;
    a sampling clock means providing a first clock pulse during one part of each sampling period and second clock pulse during another part of the sampling period;
    first means responsive to said first register and said first clock pulse for providing signals corresponding to the contents of said first register during each sampling period;
    control means responsive to said first and second clock pulses for connecting said first register between the output and input of said adder under control of the first clock pulse and the second register under control of the second clock pulse;
    adder control means responsive to said data signals and said clock signals for generating a control signal applied to said adder which causes said adder to perform a subtraction function under control of said first clock signal when the data signal represents a binary zero value and an addition function at all other times;
    an address control generator responsive to data signals, and signals from said first means for generating a first address signal during each sampling period under control of said first clock signal for accessing a said first numerical value from said memory for modifying the value stored in said first register as a function of the numerical value accessed and the status of the adder control means, and for generating a second address signal during each sampling period under control of said second clock pulse for accessing a second numerical value for modifying the value stored in said second register as a function of the numerical value accessed; and
    second means responsive to the adder output under control of said second clock pulse for converting the digital adder output to an analog signal.

2. An FSK modulator as set forth in claim 1 in which the plurality of second numerical values are selected to cause frequency transitions between said first and second frequencies to be made in a substantially continuous manner within a single baud time whereby out of band frequency components in the generated signal are substantially reduced.

3. An FSK modulator as set forth in claim 2 in which the said first numeric values are all zero and a positive value substantially smaller than the numeric value of the sampling frequency, which when accumulated in the first register will when selected outputs therefrom are monitored provide n substantially equispaced detectably different outputs during each baud time.

4. An FSK modulator as set forth in claim 3 in which n is selected to have a value of eight.

5. An FSK modulator suitable for modulating serial binary encoded data at different baud rates and modulation frequencies comprising:
    first memory means storing for each said baud rate and frequencies a first numerical value representing a fraction of the baud time of the serially encoded binary data and a plurality of second numerical values each representing different frequency increments;
    an adder having two inputs, one of which is connected to the output of said first memory means;
    first and second registers, each having an input connected to the output of said adder and an output connected to the said other input of said adder;
    a sampling clock means providing a first clock pulse during one part of each sampling period and second clock pulse during another part of the sampling period;
    first means responsive to said first register and said first clock pulse for providing signals corresponding to the contents of said first register during each sampling period;
    control means responsive to said first and second clock pulses for connecting said first register between the output and input of said adder under control of the first clock pulse and the second register under control of the second clock pulse;
    adder control means responsive to said data signals and said clock signals for generating a control signal applied to said adder which causes said adder to perform a subtraction function under control of said first clock signal when the data signal represents a binary zero value and an addition function at all other times;
    an address control generator responsive to data signals, a line control word signal which uniquely defines one of said baud rates and frequencies, and signals from said first means for generating a first address signal during each sampling period under control of said first clock signal for accessing one of said first numerical values corresponding to the line control word signal from said memory for modifying the value stored in said first register as a function of the numerical value accessed and the status of the adder control means, and for generating a second address signal during each sampling period under control of said second clock pulse for accessing a second numerical value from the plurality of second numerical values corresponding to the line control word signal for modifying the value stored in said second register as a function of the numerical value accessed; and second register means responsive to the adder output under control of said second clock pulse for converting the digital adder output to an analog signal.

6. An FSK modulator as set forth in claim 5 in which each of the plurality of seond numerical values are selected to cause frequency transitions between the frequencies used for encoding the data to be made in a substantially continuous manner within a single baud time whereby out of band frequency components in the generated signals are substantially reduced.

7. An FSK modulator as set forth in claim 6 in which each of the said first numerical values are all zero and a positive value substantially smaller than the numeric value of the sampling frequency, which when accumulated in the first register will when selected outputs therefrom are monitored provide n substantially equispaced detectably different outputs during each baud time.

8. An FSK modulator as set forth in claim 7 in which n is selected to have a value of eight.

9. A method for digitally generating narrow bandwidth FSK modulated signals comprising the steps of:
  storing a predetermined trajectory for the instantaneous frequency transitions in the form of n discrete digital numerical values;
  selecting within each baud time in which a frequency transition occurs each of said n discrete numerical values at least once, said selections being determined as a function of the interbaud time;
  calculating the instantaneous phase in digital form based on each selected numerical value; and
  converting the calculated instantaneous digital phase to an analog signal having the same instantaneous phase.

* * * * *